United States Patent [19]

Lindsay

[11] Patent Number: 4,509,886
[45] Date of Patent: Apr. 9, 1985

[54] CUTTING TOOL WITH CUTTING INSERTS HAVING POSITIONING KEYWAYS

[76] Inventor: Harold W. Lindsay, 2451 NW. 30th, Portland, Oreg. 97210

[21] Appl. No.: 555,016

[22] Filed: Nov. 25, 1983

[51] Int. Cl.³ .................. B23P 15/28; B26D 1/00; B26D 3/00
[52] U.S. Cl. .................. 407/102; 407/107; 407/113
[58] Field of Search .......... 407/102, 93, 94, 95, 407/96, 98, 103, 107, 108, 112, 41, 49, 40, 47, 100

[56] References Cited

U.S. PATENT DOCUMENTS

| 1,184,368 | 5/1916 | Morgal | 407/47 |
| 3,566,496 | 3/1971 | Kezirian | 407/95 |
| 3,754,309 | 8/1973 | Jones et al. | 407/113 |
| 3,788,625 | 1/1974 | Lindsay | 407/40 |
| 3,838,724 | 10/1974 | Buchacher et al. | 407/49 |
| 4,118,138 | 10/1978 | Takacs et al. | 407/112 |
| 4,137,000 | 1/1979 | Takacs et al. | 407/101 |

FOREIGN PATENT DOCUMENTS 944139 3/1974 Canada .

Primary Examiner—Francis S. Husar
Assistant Examiner—William E. Terrell
Attorney, Agent, or Firm—Klarquist, Sparkman, Campbell, Leigh & Whinston

[57] ABSTRACT

A cutting tool provides a cutting insert receiving slot with a retaining lip to engage a face of the insert and prevent movement normal to its face. The insert has a centrally disposed keyway extending fully across one face. In one embodiment the lip engages the keyway; in another embodiment a locating pin engages the keyway to prevent longitudinal movement of the insert relative to the holder.

6 Claims, 7 Drawing Figures

CUTTING TOOL WITH CUTTING INSERTS HAVING POSITIONING KEYWAYS

BACKGROUND OF THE INVENTION

This invention relates to cutting tools and more particularly, to cutting tools utilizing indexable and replaceable carbide inserts for use in grooving and tapping.

Cutting tools are known wherein a replaceable carbide insert is disposed in a slot extending generally longitudinally inwardly from an end face of a holder. A clamping means retains the insert in the slot by engaging a cam-like recess in a side of the insert. The tool is designed so that the insert can be indexed on its transverse axis such that each cutting edge can be used. Inserts having such cam-like side recesses, however, are expensive.

Accordingly, it is the primary object of the present invention to provide a cutting tool of the above type that can use indexable and replaceable carbide inserts that are less expensive than inserts that have heretofore been available for this use.

It is a further object of the present invention to provide a cutting tool of the above type that can be used with indexable and replaceable carbide inserts that have a transversely extending keyway machined in one face. Such inserts are relatively inexpensive to manufacture.

SUMMARY OF THE INVENTION

My cutting tool comprises a holder for holding a cutting insert of carbide or the like, the holder having an end face for placement adjacent a workpiece. A cutting insert receiving slot extends generally longitudinally of the holder from the end face. The slot is adjacent a side of the holder and defines an end face and a bottom and a pair of walls within the holder. The wall adjacent the side of the cutter is cut parallel to the bottom of the slot to form a retaining lip which extends normal to the bottom and is flush with the side of the holder.

A cutting insert of carbide or the like is received in the slot such that one side of the insert is supported by the bottom of the slot and a cutting edge of the insert extends outwardly of the slot in the longitudinal direction of the holder. A face of the insert is provided with a centrally disposed keyway which extends fully across the insert.

Clamping means are provided to engage the other side of the insert to clamp it into the slot and into engagement with the lip which prevents movement of the insert normal to its face.

In one embodiment the retaining lip is cut to a length less than the length of the slot and is positioned intermediate the ends thereof. The keyway in the insert has a dimension in the longitudinal direction of the holder equal to the length of the lip. The keyway has a dimension in the transverse direction of the holder equal to the dimension of the lip in the transverse direction. The lip engages the keyway longitudinally to locate the insert relative to the holder and to prevent longitudinal movement with respect thereto, also to prevent movement normal to the face of the insert.

In another embodiment a key extends outwardly of a wall of the slot normal to the longitudinal direction thereof. The key engages the keyway of the insert longitudinally to locate the insert relative to the holder and to prevent longitudinal movement with respect thereto.

Preferably, the key comprises a locating pin extending transversely into the slot from the wall opposite the retaining lip. The slot may be obliquely disposed to the longitudinal axis of the holder, whereby the wall forming the retaining lip tapers uniformly in thickness in the transverse direction of the holder. The key locates the insert relative to the holder and prevents longitudinal movement with respect thereto. The lip prevents movement normal to the face of the insert.

DESCRIPTION OF THE PREFERRED EMBODIMENTS

Figure 1:
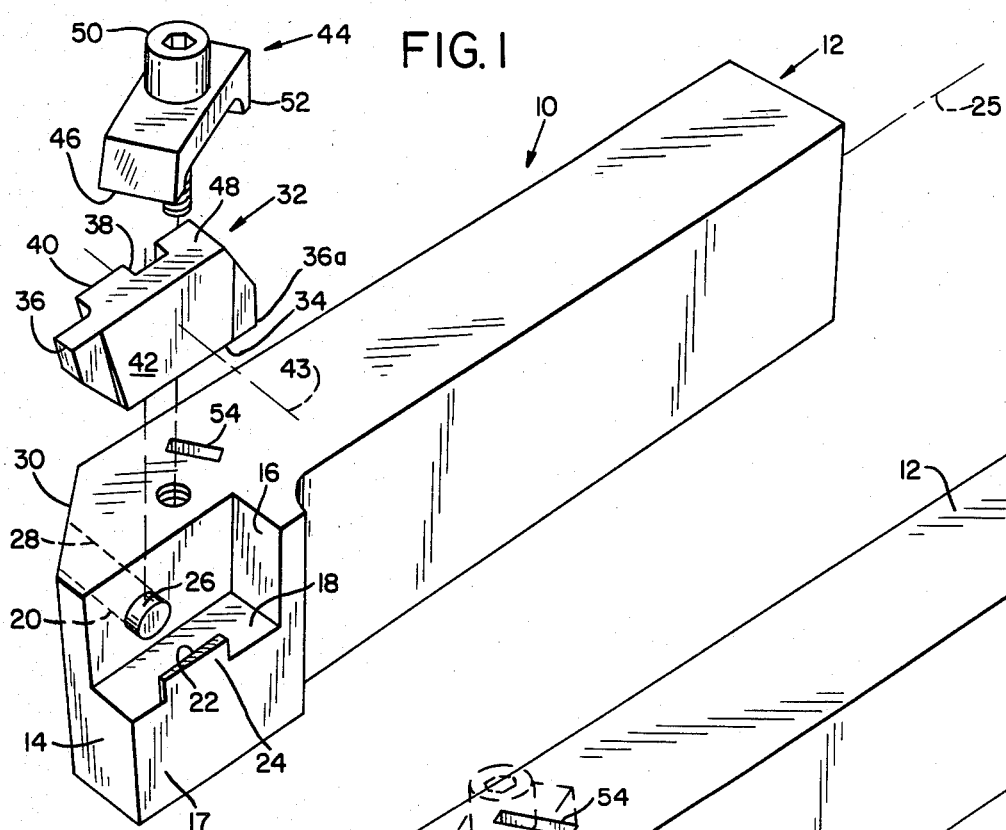
FIG. 1 is an exploded perspective view of one embodiment of my invention.
Figure 2:
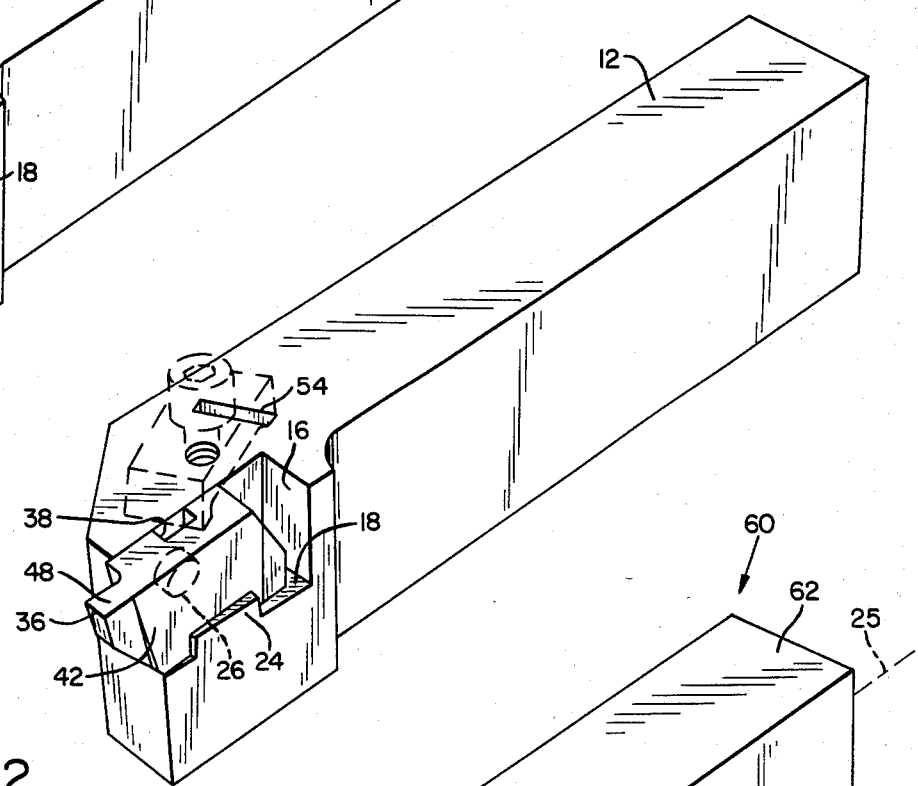
FIG. 2 is a perspective assembled view of the embodiment of FIG. 1 showing the clamping means in phantom.

Referring to the drawings and particularly to FIGS. 1, 2, 4 and 5, my grooving tool 10 includes a holder 12 having an end face 14. A cutting insert receiving slot is machined generally longitudinally inwardly from the end face 14. The slot is adjacent a side 17 of the holder and defines an end face 16, a bottom 18 and a pair of walls 20, 22 as shown.

The wall 22 is further machined parallel to the bottom 18 to form a retaining lip 24 which extends normal to the bottom and is flush with the side 17. The lip 24 is cut such that its length is less than the length of the slot 16 and such that it is disposed intermediate the ends thereof. Because the slot is obliquely disposed to the longitudinal axis 25 of the tool, the lip 24 tapers uniformly in thickness in the transverse direction, as shown.

A locating key or pin 26 is received in a generally transversely extending hole 28 in one side 30 of the tool. The pin 26 extends outwardly of the wall 20 and inwardly of the slot normal to the longitudinal direction thereof.

A cutting insert 32 is disposed in the slot such that one side 34 is supported by the bottom 18. A cutting edge 36 extends outwardly of the slot 16 in the longitudinal direction of the holder for engaging a workpiece (not shown).

The insert 32 is provided with a centrally disposed keyway 38 which extends fully across the face 40 of the insert. When the insert 32 is placed in the slot, the pin 26 engages the keyway 38 to locate the insert 32 longitudinally relative to the tool holder 12 and prevent longitudinal movement with respect thereto. The lip 24 engages the opposite face 42 to prevent movement of the insert normal to such face, that is, normal to the walls 20, 22. When the edge 36 becomes dull, the insert can be indexed on its transverse axis 43 to present the other edge 36a for cutting.

A clamp 44 has an inwardly disposed end 46 which contacts a side 48 of the insert 32. When a socket head capscrew 50 is tightened, a tail 52 is received in a slot 54. The clamp 44 thus retains the insert 32 against the bottom 18, maintaining the face 42 in engagement with the lip 24, which prevents movement of the insert normal to its faces.

It can be seen that the tool 10 accurately retains the insert 32 in position. The pin 26 engages the keyway 38 accurately to locate the insert longitudinally relative to the holder 12 and prevent longitudinal movement with respect thereto. The lip 24 engages the face 42 to prevent movement normal thereto. The clamp 44 engages the exteriorly disposed side 48 of the insert to clamp it in the slot and into engagement with the lip 24.

Figure 3:
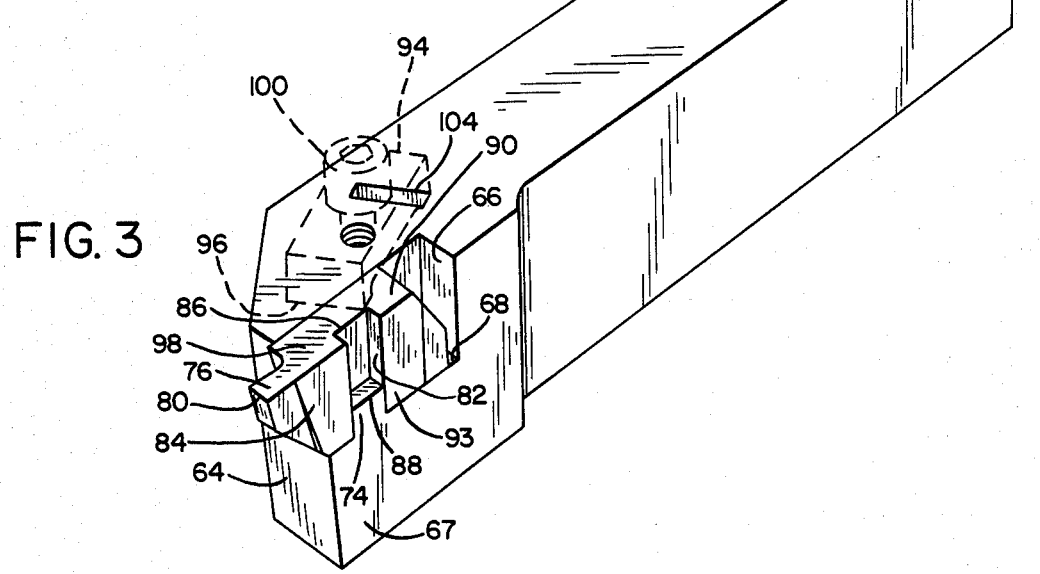
FIG. 3 is a perspective assembled view of another embodiment of my invention, also showing the clamping means in phantom.
Figure 4:
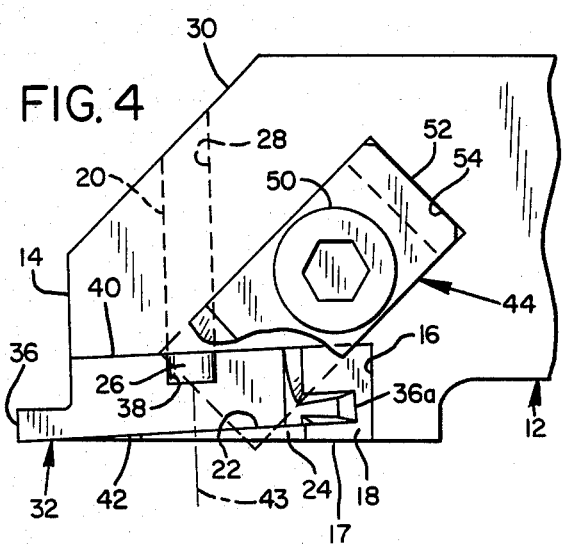
FIG. 4 is a top plan view of the embodiment of FIGS. 1 and 2.
Figure 5:
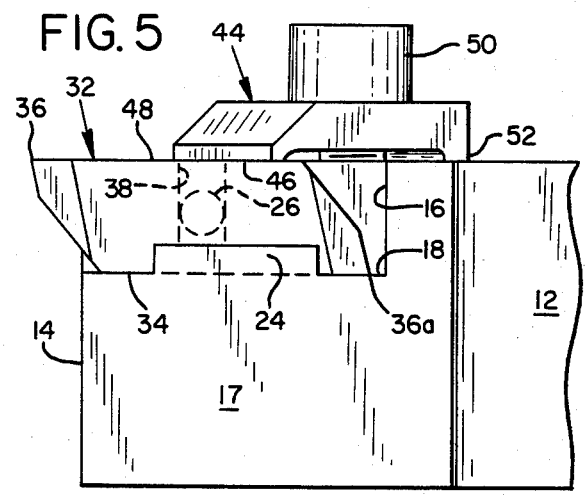
FIG. 5 is a side elevational view of the embodiment of FIGS. 1 and 2.
Figure 6:
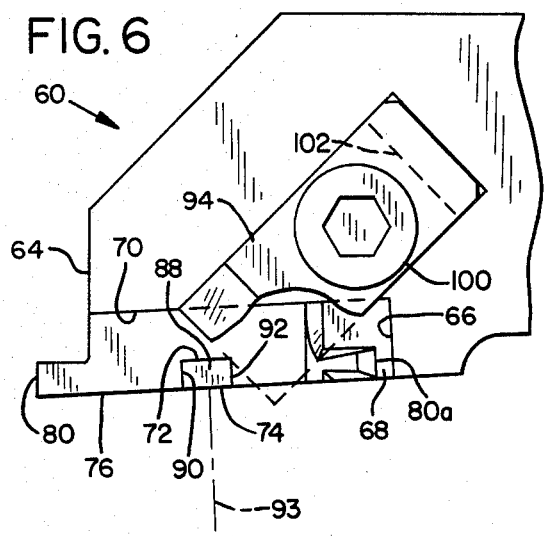
FIG. 6 is a top plan view of the embodiment of FIG. 3.
Figure 7:
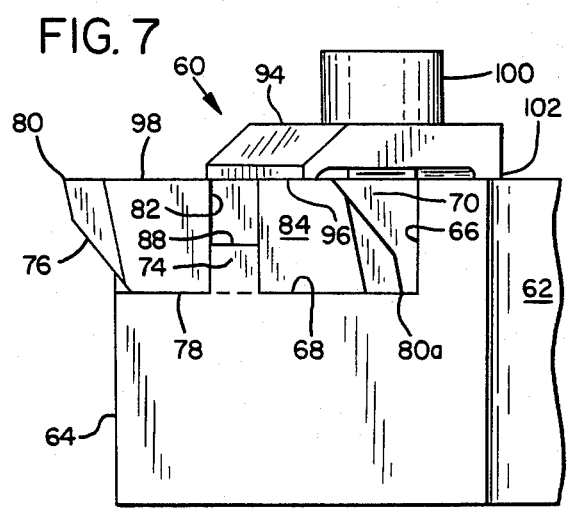
FIG. 7 is a side elevational view of the embodiment of FIG. 3.

In the embodiment shown in FIGS. 3, 6 and 7, a grooving tool 60 includes a holder 62 having an end face 64. A cutting insert receiving slot is machined generally longitudinally inwardly from the end face 64. The slot is adjacent a side 67 of the holder 62 and defines an end face 66, a bottom 68 and a pair of walls 70, 72, as shown. In this embodiment the slot is formed parallel to the side 67 such that the wall 72 is uniform in the transverse dimension.

The wall 72 is machined parallel to the bottom 68 of the slot 66 to form a retaining lip 74 which extends normal to the bottom 68 and is flush with the side 67 of the holder. The lip 74 is cut to a length less than the length of the slot and such that it is disposed intermediate the ends thereof.

A cutting insert 76 is disposed in the slot 66 such that one side 78 is supported by the bottom 68. A cutting edge 80 extends outwardly of the slot in the longitudinal direction of the holder 62 for engaging a workpiece (not shown).

The insert 76 is provided with a centrally disposed keyway 82 which extends fully across the face 84. The keyway is formed such that its length 86 is precisely equal to the length 88 of the lip 74. The keyway 82 has a dimension 90 in the transverse direction of the holder 40 (depth) precisely equal to the dimension 92 (thickness) of the lip 74 in the transverse direction. See FIG. 6. Thus, when the insert 76 is placed in the slot 66, the lip 74 engages the keyway 82 longitudinally to locate the insert relative to the holder 62 and prevent longitudinal movement with respect thereto. The lip 74 also prevents movement normal to the face of the insert. Inasmuch as the retaining lip 74 and keyway 82 are each uniformly rectangular in cross section, the insert 76 is indexable on its transverse axis 93 to present the other edge 80a for cutting. Because the thickness 92 of the lip is equal to the depth 90 of the keyway, the face 84 of the insert is flush with the side 67 of the holder.

A clamp 94 has an inwardly depending end 96 which contacts a side 98 of the insert 76 such that when a socket head capscrew 100 is tightened, a tail 102 on the clamp 94 being received in a slot 104 in the holder 62, the clamp 94 retains the insert 76 within the slot 66, maintaining the keyway 82 in engagement with the lip 74 to prevent movement of the insert both longitudinally with respect to the holder and transversely with respect to its faces.

I claim:

1. A cutting tool comprising:

a holder having a longitudinal mounting axis and a plurality of sides generally parallel thereto, the holder having a transverse axis perpendicular to the longitudinal axis, the holder having an end face generally parallel to the transverse axis, the end face being adapted to be placed adjacent a workpiece;

a cutting insert receiving slot extending inwardly of the holder from the end face generally in the direction of the longitudinal axis of the holder, the slot being adjacent one of the sides of the holder, the slot defining an end face and a bottom and a pair of walls within the holder, one of the pair of walls being adjacent the one side of the holder and flush therewith, the wall adjacent the one side of the holder being cut parallel to the bottom of the slot to form a retaining lip extending normal to the bottom and flush with the one side of the holder, the retaining lip being cut to a length less than the length of the slot, the retaining lip being disposed between the end face of the holder and the end face of the slot;

a cutting insert received in the slot, the insert having front and back faces and top and bottom sides and opposite ends which form cutting edges, the bottom side of the insert being supported by the bottom of the slot, a cutting edge of the insert extending outwardly of the slot in the direction of the longitudinal axis of the holder, the front face of the insert being provided with a centrally disposed keyway extending across the same from the top to the bottom sides, the keyway having a dimension in the direction of the longitudinal axis of the holder equal to the length of the lip, the keyway having a dimension in the direction of the transverse axis of the holder equal to the dimension of the lip in the direction of the transverse axis of the holder, the lip engaging the keyway longitudinally to locate the insert relative to the holder and to prevent movement thereof in the direction of the longitudinal axis of the holder, the lip preventing movement of the insert normal to its face; and clamping means engaging the top side of the insert to clamp the insert into the slot and into engagement with the lip.

2. A cutting tool as in claim 1, wherein the retaining lip and the keyway are each rectangular in cross section.

3. A cutting tool as in claim 1, wherein the keyway provided face of the insert is flush with the side of the holder.

4. A cutting tool comprising:

a holder having a longitudinal mounting axis and a plurality of sides generally parallel thereto, the holder having a transverse axis perpendicular to the longitudinal axis, the holder having an end face generally parallel to the transverse axis, the end face being adapted to be placed adjacent a workpiece;

a cutting insert receiving slot extending inwardly of the holder from the end face generally in the direction of the longitudinal axis of the holder, the slot being adjacent one of the sides of the holder, the slot defining an end face and a bottom and a pair of walls within the holder, one of the pair of walls being adjacent the one side of the holder and flush therewith, the wall adjacent the one side of the holder being cut parallel to the bottom of the slot to form a retaining lip extending normal to the bottom and flush with the one side of the holder, the retaining lip being cut to a length less than the length of the slot, the retaining lip being disposed between the end face of the holder and the end face of the slot;

a key extending outwardly of the other of the pair of walls and into the slot normal to the longitudinal axis of the holder;

a cutting insert received in the slot, the insert having front and back faces and top and bottom sides and opposite ends which form cutting edges, the bottom side of the insert being supported by the bottom of the slot, a cutting edge of the insert extending outwardly of the slot in the direction of the longitudinal axis of the holder, the back face of the insert being provided with a centrally disposed keyway extending across the same from the top to the bottom sides, the key engaging the keyway longitudinally to locate the insert relative to the holder and to prevent movement thereof in the direction of the longitudinal axis of the holder, the lip preventing movement of the insert normal to its face; and clamping means engaging the top side of the insert to clamp the insert into the slot and into engagement with the lip.

5. A tool as in claim 4, wherein the key comprises a locating pin extending transversely into the slot from the other of the walls thereof, the locating pin engaging the keyway in the back face of the insert.

6. A tool as in claim 4, wherein the slot is obliquely disposed to the longitudinal axis of the holder, the wall forming the retaining lip having a thickness which is uniformly tapered in the direction of the transverse axis of the holder.

* * * * *